United States Patent [19]
Blake

[11] 3,931,758
[45] Jan. 13, 1976

[54] SPIT

[75] Inventor: Donald Arthur Blake, Burnaby, Canada

[73] Assignee: The Raymond Lee Organization, Inc., New York, N.Y. ; a part interest

[22] Filed: June 28, 1974

[21] Appl. No.: 483,961

[52] U.S. Cl............................... 99/419; 99/421 A
[51] Int. Cl.².......................................... A47J 37/04
[58] Field of Search.................... 99/419, 420, 421; 15/144 B

[56] References Cited
UNITED STATES PATENTS

| | | | |
|---|---|---|---|
| 624,356 | 5/1899 | Lurie et al. | 99/419 X |
| 1,406,841 | 2/1922 | Foss | 15/144 B |
| 1,755,646 | 4/1930 | Halstead | 99/419 |
| 2,110,640 | 3/1938 | Aldrich | 99/419 |
| 2,183,938 | 12/1939 | Lewis | 99/419 X |
| 2,815,706 | 12/1957 | Weinberger | 99/419 |
| 2,999,452 | 9/1961 | Hardy | 99/419 X |
| 3,745,910 | 7/1973 | Delamater | 99/419 |

FOREIGN PATENTS OR APPLICATIONS
1,386,996   12/1964   France ............................... 15/144 B

*Primary Examiner*—Edward L. Roberts
*Assistant Examiner*—Arthur O. Henderson

[57] ABSTRACT

Different heads containing various arrangements of elongated prongs upon which food may be impaled are detachably securable to the end of a handle constructed of a plurality of elongated tubular telescopic sections. The prongs are parallel to the axis of the handle when the head is attached to the handle, and a wire mesh member is detachably securable to the prongs in such a manner as to form a perforated grill.

1 Claim, 8 Drawing Figures

SPIT

SUMMARY OF THE INVENTION

The invention is directed towards improvements in spits used to cook such foods as frankfurters and hamburgers over fires at barbeques and picnics.

To this end, a handle is constructed of a plurality of elongated tubular telescopic sections, which nest inside each other and form an elongated, tapered rod when in their fully extended state. One of a plurality of heads may be attached to the thinner end of this handle when the handle is extended, by utilizing attachment means. The heads all have elongated prongs upon which food may be impaled, with different heads having different arrangements of prongs for different culinary purposes.

DETAILED DESCRIPTION OF PREFERRED EMBODIMENTS

Figure 1:
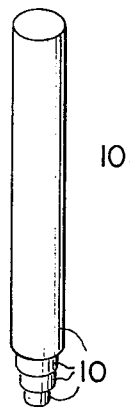
FIG. 1 is a drawing of the handle in its telescoped state.
Figure 3:
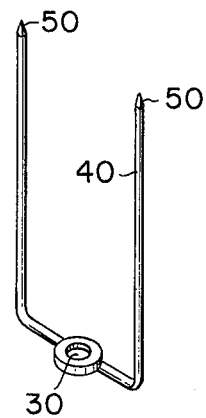
FIGS. 3, 4, 5 and 6 show different heads usable in combination with the handle of the invention.
Figure 4:
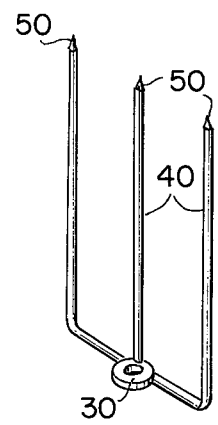
Figure 2:
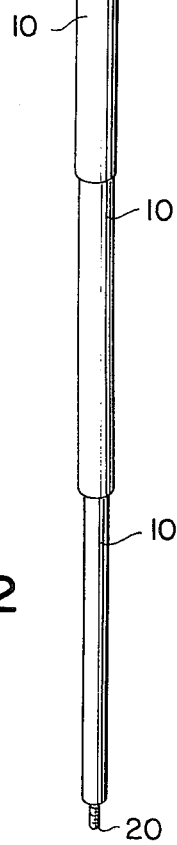
FIG. 2 is a drawing of the handle in its extended state.
Figure 5:
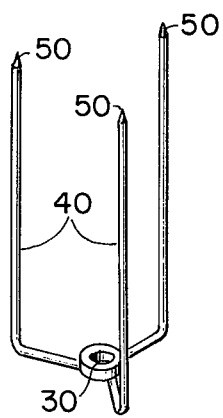
Figure 6:
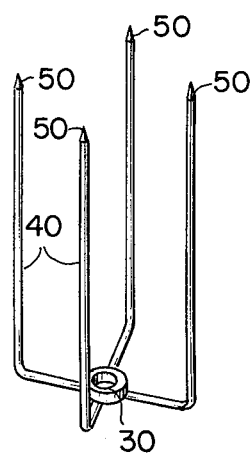

Referring now to the drawings, in which like elements are denoted by the same identification numbers in all the figures, a handle such as is shown in FIGS. 1 and 2 is constructed of a plurality of elongated telescopic tubular sections 10 which nest together to form a compact stack in a telescoped state such as is shown in FIG. 1 or a tapered elongated rod in an extended state such as is shown in FIG. 2.

A threaded bolt 20 is disposed at the end of the thinnest handle section, as is shown in FIG. 1. On this bolt may be threaded a head such as is shown in each of the FIGS. 3 through 6. The bolt is threaded into a tapped hole 30 in a ring to which a plurality of elongated prongs 40 are welded. Each prong has a sharpened tip 50 at its extremity, and the prongs are all bent so as to extend perpendicularly in the same direction out of the plane of the ring, in a manner that the exes of all the prongs on a given head are parallel to the axis of the handle when the head is attached thereto by threading the bolt into the tapped hole. As is shown in FIGS. 3 through 6, the prongs may be arranged in straight lines, or at the vertices of an equilateral triangle or a square.

Figure 8:
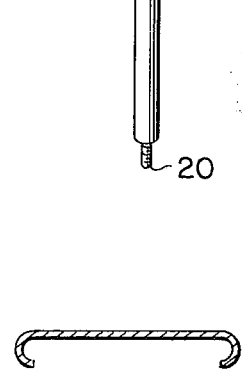
FIG. 8 shows a view taken along the line 8 — 8 in FIG. 7.
Figure 7:
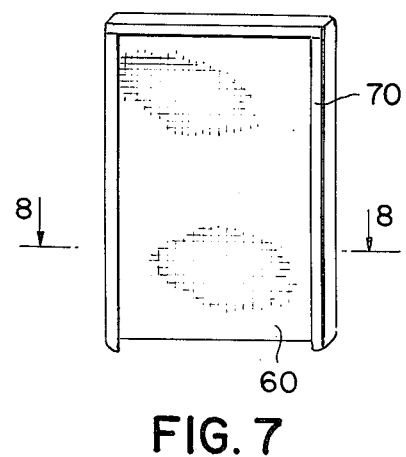
FIG. 7 shows a grill attachment for use with the head depicted in FIG. 3.

A rectangular sheet of wire mesh 60 has a lip 70 around three sides. The lip is bent over and extends inwardly beneath the screen as is shown in FIG. 8. When the screen is slid over the prongs of the heads shown in FIGS. 3 and 4, the outer prongs engage the lip and a flat perforated grill is formed.

While the invention has been described with detailed reference to the drawings, the protection sought is to be limited only by the terms of the claims which follow.

I claim:

1. A spit, comprising:
   a handle constructed from a plurality of elongated tubular telescopic sections;
   a threaded bolt located at an end of the handle;
   a head having a tapped hole and a plurality of elongated prongs upon which frankfurters and other foods may be impaled, the prongs being located at regular intervals along a straight line so as to be parallel to the axis of the handle when the bolt is threaded into the tapped hole and the head is thereby detachably secured to the handle; and
   a rectangular wire mesh member having a turned in bent over peripheral lip around three adjacent sides, including two long sides, said member being detachably secured to the outer prongs by sliding the long sides of the member thereover, said outer prongs engaging the lip of said long sides, thus forming a flat perforated grill.

* * * * *